(12) United States Patent
Singhal et al.

(10) Patent No.: US 11,605,176 B2
(45) Date of Patent: Mar. 14, 2023

(54) RETRIEVING IMAGES THAT CORRESPOND TO A TARGET BODY TYPE AND POSE

(71) Applicant: Adobe, Inc., San Jose, CA (US)

(72) Inventors: Gourav Singhal, Delhi (IN); Sourabh Gupta, Noida-Uttar Pradesh (IN); Mrinal Sharma, Jharkhand (IN)

(73) Assignee: Adobe, Inc., San Jose, CA (US)

( * ) Notice: Subject to any disclaimer, the term of this patent is extended or adjusted under 35 U.S.C. 154(b) by 322 days.

(21) Appl. No.: 17/154,250

(22) Filed: Jan. 21, 2021

(65) Prior Publication Data

US 2022/0230344 A1 Jul. 21, 2022

(51) Int. Cl.
| | |
|---|---|
| *G06T 7/60* | (2017.01) |
| *G06T 7/73* | (2017.01) |
| *G06T 7/174* | (2017.01) |
| *G06N 3/08* | (2023.01) |
| *G06N 3/045* | (2023.01) |

(52) U.S. Cl.
CPC ............... *G06T 7/60* (2013.01); *G06N 3/045* (2023.01); *G06N 3/08* (2013.01); *G06T 7/174* (2017.01); *G06T 7/75* (2017.01); *G06T 2207/20081* (2013.01); *G06T 2207/20084* (2013.01); *G06T 2207/20132* (2013.01)

(58) Field of Classification Search
CPC ..... G06T 13/40; G06T 2210/16; G06T 11/60; G06T 2207/30196; G06T 19/006; G06T 2207/20081; G06T 2207/20084; G06T 2207/10016; G06T 7/11; G06T 7/75; G06T 19/00; G06T 7/20; G06T 2207/10028; G06T 7/70; G06T 11/00; G06T 11/001; G06T 15/04; G06T 19/20; G06T 2207/10024; G06T 2207/30168
USPC ......................................................... 382/100
See application file for complete search history.

(56) References Cited

U.S. PATENT DOCUMENTS

| | | |
|---|---|---|
| 2019/0147305 A1 | 5/2019 | Lu et al. |
| 2019/0318405 A1 | 10/2019 | Hu et al. |
| 2020/0380243 A1 | 12/2020 | Singh et al. |
| 2021/0065418 A1 | 3/2021 | Han et al. |
| 2021/0150249 A1 | 5/2021 | Zheng et al. |
| 2021/0287091 A1 | 9/2021 | Ge et al. |

(Continued)

OTHER PUBLICATIONS

Ravi et al, Buy me that look: An approach for recommending similar fashion products, arXiv:2008.11638v1 (Year: 2020).

(Continued)

*Primary Examiner* — Ajibola A Akinyemi
(74) *Attorney, Agent, or Firm* — Finch & Maloney PLLC

(57) ABSTRACT

Techniques are provided for providing a user with retrieved images of a specific article of clothing or accessory worn by models having a particular body type and pose as selected by the user. The images have been analyzed to identify both a body type and pose of the model wearing the article of clothing in each of the images. The images are labeled based on at least body type and pose of the model and clustered based on their labels, and are thus available for retrieval by subsequent requests by a user. In particular, a user that is interested in the article of clothing can input one or more requests for images of models having a selected body type and pose. Any of the images labeled with the selected body type and pose can then be provided to the user in any number ways.

20 Claims, 9 Drawing Sheets

(56) References Cited

U.S. PATENT DOCUMENTS

| | | | |
|---|---|---|---|
| 2021/0350451 A1* | 11/2021 | Morin | G06Q 30/0643 |
| 2021/0405831 A1* | 12/2021 | Mourkogiannis | G06K 7/1413 |
| 2022/0200282 A1* | 6/2022 | Alali | H02J 3/01 |
| 2022/0237417 A1 | 7/2022 | Singhal et al. | |

OTHER PUBLICATIONS

Cheng et al., Fashion meets computer vision: a survey, arXiv:2003. 13988v1 (Year: 2020).

\* cited by examiner

RETRIEVING IMAGES THAT CORRESPOND TO A TARGET BODY TYPE AND POSE

FIELD OF THE DISCLOSURE

This disclosure relates generally to the field of image processing, and more particularly, to techniques for identifying images that correspond to a target body type and pose.

BACKGROUND

Image-based searching (also sometimes referred to as "reverse image searching") is becoming increasingly popular, with advent of high computing power machines. For example, given a query image, an image search system can find other images that are similar to the query image. This allows a user to discover images that are related to, or similar to, the specific query image. Such image-based searching is not to be confused with face retrieval techniques, which search an image database with a query face to identify other images that include that same face (same person). However, there remain a number of non-trivial issues with respect to image-based search, as will be appreciated in light of this disclosure. For instance, there is currently no search mechanism available that would allow a user search for an image showing a model having a specific body type and wearing a specific target product (e.g., such as a blouse that the user is looking at online). The reason for this lack of development in the image search space is that current image retrieval systems lack the intelligence to infer or otherwise disentangle different contextual features of a target object depicted in an image, particularly when those contextual features are multifaceted (each context feature can be one of many states) and independent of one another (the state of one context feature is independent of the state of the other context features). Therefore, complex and non-trivial issues associated with image-based search remain.

SUMMARY

Techniques are provided herein for providing a user with images depicting a target object within a target context, and more particularly, for providing a user with images of a given article of clothing or accessory worn by models having a particular body type and pose as selected by the user. The images may be collected from previous buyers of the article of clothing or accessory that have uploaded pictures of themselves or of others wearing the article of clothing or accessory. Once received, the images are analyzed using neural networks trained to identify both a body type and pose of the model wearing the article of clothing or accessory in each of the images, according to some embodiments. More specifically, a first neural network includes one or more body type classification layers that are arranged during supervised training of the first neural network to identify the body type of the model based on its features in the image, and a second neural network includes one or more pose classification layers that are arranged during supervised training of the second neural network to identify the pose of the model based on its features in the image. Based on the output from the first and second neural networks, the images can be labeled based on at least body type and pose of the model and clustered based on their labels. A user that is interested in purchasing or viewing the article of clothing or accessory can input a request for one or more images of models wearing that article of clothing or accessory. The request further specifies a target body type and a target pose, as selected by the user. Any of the images labeled with the target body type and pose can then be provided to the user, in response to the request. The techniques are especially well-suited in the context of on-line shopping, where a webpage used for purchasing a particular article of clothing or accessory not only allows the user to purchase the article of clothing or accessory, but further allows the user to have a relatively high degree of apparel visualization based on the user's body type, which is not possible with currently existing technology. For instance, in one such embodiment, the website can include a banner or button that a user can click on in order to request additional images of the article of clothing or accessory worn by models having the user-selected target body type and pose. It should be noted that the term "model" is used herein to simply refer to any person wearing the article of clothing or accessory and does not need to refer to a professional model. Numerous variations and embodiments will be appreciated in light of this disclosure.

Any number of non-transitory machine-readable mediums (e.g., embedded memory, on-chip memory, read only memory, random access memory, solid state drives, and any other physical storage mediums) can be used to encode instructions that, when executed by one or more processors, cause an embodiment of the techniques provided herein to be carried out, thereby allowing for images of models having a target body type and pose to be provided to a user. Likewise, the techniques can be implemented in hardware (e.g., logic circuits such as field programmable gate array, purpose-built semiconductor, microcontroller with a number of input/output ports and embedded routines). Further note that examples provided herein focus on articles of clothing, but any wearable items (e.g., jewelry, eyewear, etc.) can benefit from the techniques provided herein. Numerous embodiments will be apparent in light of this disclosure.

DETAILED DESCRIPTION

Figure 1A:
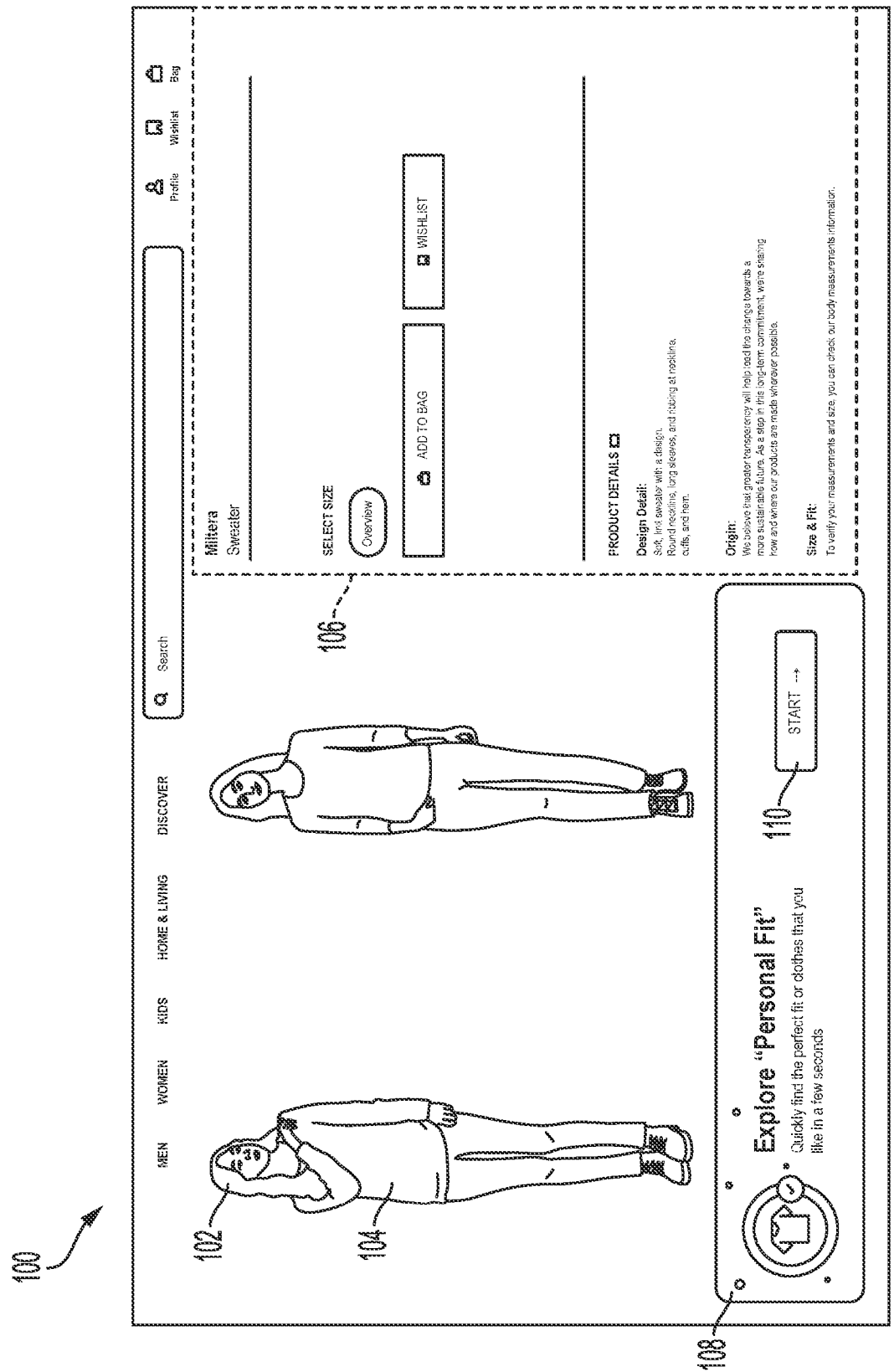
FIGS. 1A-1D show example user interfaces of a fit explore system configured to receive input from a user and to output images of different models wearing an article of clothing, in accordance with some embodiments of the present disclosure.

Techniques are provided herein for identifying images that depict a model wearing an object of interest and having a target body type and pose. Although a number of applications will be appreciated, the techniques are particularly well-suited in the context of online shopping, where they can be used in providing a user interested in an article of clothing with images of models wearing the article of clothing having a body type and pose as selected by the user. As will be appreciated, such an embodiment can be used to provide the user with a relatively good sense of how a particular article of clothing would look on his or her body, a sense that is lacking from the current online shopping experience. For example, some existing websites allow users to view an article of clothing from different angles, but the user has no control over what model is wearing the article of clothing in the images. Other existing websites allow a user to enter body measurements to suggest a best fit or size of the article of clothing for their body, but this still does not help a user visualize how the article of clothing will look on their body. One of the primary issues is that there are many different body types, and a user with one particular body type may have trouble visualizing how the article of clothing will look on them if the model wearing the article of clothing on the website has a different body type. However, providing images of different models with different body types wearing an article of clothing is cost prohibitive and time consuming for merchants and sellers to entertain, especially when considering the number of different clothing items being sold. To this end, the techniques provided herein can be used in conjunction with existing images to provide an image retrieval system that is programmed or otherwise configured to identify one or more of those existing images that correspond to a target product being worn on a target body type and pose. In some such embodiments, the existing images include user generated content (UGC).

As explained above, existing image retrieval systems cannot identify the body type and/or pose of models in different images. In more detail, existing image retrieval systems do not have the intelligence to disentangle target context features (e.g., body type and pose) of a target object (e.g., a model) depicted in an image. For instance, an image retrieval system may be able to find an image depicting a specific object (e.g., a shirt), but finding an image that depicts the object in a specific context is more difficult, particularly when the context is multifaceted such that it includes multiple features that are independent of one another (e.g., a shirt on a model having a certain body type and pose). This complex problem is further exacerbated when the context features themselves are multifaceted (e.g., where there are multiple body types to choose from and multiple body poses to choose from). One example such case is where the context of a target object (e.g., the shirt) includes both a target environment (e.g., the model body type) in which the object is depicted, as well as a target orientation (e.g., body pose) of the object within that target environment. In such cases, the image retrieval system would need to understand three distinct things: the target object itself (e.g., the shirt), the target environment (e.g., the body type) of that target object, and the orientation (e.g., body pose) of that target object within the target environment. Even with such information, the system must further know where to look for the image depicting the target object in that complex context.

Thus, retrieving specific images depicting a desired product being worn by a model having particular a body type and pose is not possible. The present disclosure provides techniques that address these underlying problems of existing image search systems. In accordance with an embodiment of the present disclosure, the problem with respect to the impracticality of imaging specific product-model pairings is solved by leveraging user generated content to collect a large number of images of models wearing a specific product (clothing or accessory) and having varying body types and poses. Then, neural networks trained to identify particular model characteristics, which are used to classify each of the received images depicting a specific product (e.g., article of clothing), based at least on the model's body type and pose. In more detail, each neural network includes one or more layers having a unique set of weights that result from training, each weight assigned to a neuron or pathway between neurons. It is these weights that characterize the network's intelligence and ability to infer body type and pose independently of one another, as variously described herein. In this way, subsequent searching performed by a user for images depicting the specific product being worn by a model with a particular body type and pose is a streamlined process, since the images have already been classified by the neural networks.

In more detail, and according to some embodiments, images uploaded by many different users of an article of clothing being worn by those various users (models) are collected and analyzed in order to categorize the models in the images based on their body type and pose. Such user-provided images are commonly provided, for instance, in the review section of a website (many websites allow purchasers to post online product reviews, including selfies and other images of the purchaser wearing the product they purchased). In this way, a user can request images of models wearing the article of clothing that have a particular body type and/or pose, and the images of the article of clothing that match the user's selections can be quickly provided. Such images may be uploaded, for instance, in online product reviews or as social media, or other publicly accessible locations. Numerous variations and embodiments will be appreciated in light of this disclosure.

In further detail, and according to an embodiment, various images from across any number of platforms are collected, wherein the images depict models wearing a particular article of clothing or accessory. The images are analyzed by inputting them into one or more neural networks trained to identify a body type and a pose of the model in each of the images. In some embodiments, a first neural network is trained in a supervised fashion to recognize a model as having one of a pre-determined number of different body types, and a second neural network is trained in a supervised fashion to recognize a model as having one of a pre-determined number of different poses. More specifically, one or more body type classification layers of the first neural network are configured during training to identify and classify the body type of the model in a received image, and one or more pose classification layers of the second neural network are configured during training to identify and classify the pose of the model in a received image. In some such embodiments, a third neural network is trained in a supervised fashion to identify the location of the model within a given image and to generate a bounding box around that model, and to then crop the image to include only the model in the image, using the bounding box as a template. Once the given images have been labeled or otherwise grouped based on at least the body type and/or pose of the model depicted therein, those images may be stored in a manner such that they are accessible via the image retrieval system (e.g., in any form of networked storage accessible via a web browser or otherwise via any network-capable application). Labeling a given image may include, for example, editing or otherwise creating metadata associated with the image to include body type and/or pose classifications and/or storing the image in a particular folder or memory space dedicated to particular body type and/or pose classifications. Numerous such binning or clustering techniques can be used to organize the labelled images.

So, in the example context of online apparel sales, for a given article of clothing offered for sale on a given website, user-generated images are uploaded to that website over a period of time as various users of all shapes and sizes purchase the article of clothing. For instance, at least some of the purchasing users may decide to upload one or more images of themselves wearing the article of clothing, in the comments or review section of the website. Incentives can be offered to such purchasers, such as discount codes that can be used in future purchases. In any case, the image retrieval system can access those user-provided images and label or otherwise cluster those images in groupings that correspond to the different body types and/or poses. Subsequently, a query input is received from a user for images of that particular article of clothing worn by the previous purchasers (models) that have the user's specified body type and/or pose. In response to the query input, one or more of the stored images of models wearing the particular article of clothing that are labeled with the selected body type and/or pose are displayed or otherwise provided to the user. One example of the image retrieval system is referred to herein as a fit explore system as it relates specifically to retrieving images depicting models of varying body types wearing a particular article of clothing.

As will be appreciated, the present disclosure provides a technical solution to the technical problem of retrieving particular images having specific features (e.g., product and model body type) from a plurality of images (including UGC) where the specific features are not inherently identified within the images. For example, each of the images collected from users, or from other sources, wearing a particular article of clothing may not initially contain any metadata or other identifiers that indicate features of the model, such as the body type and pose of the model. Accordingly, techniques disclosed herein utilize trained neural networks to receive the user-generated images and identify a body type and/or pose of the model in the image. The images can then be labeled or otherwise grouped based on the body type and/or pose of the model in each image. Once the images are labeled and/or grouped based on body type and/or pose, they can be quickly retrieved in response to input from a user requesting images showing a model with a certain body type and/or pose.

Term Definition

As used herein, the term "model" refers to a subject identified within an image. The subject can be, for instance, a person, an animal, or other object that can have varying body types and/or poses and to which a detail or accessory can be applied. In accordance with some of the embodiments herein, the model in the image wears a particular article of clothing or accessory that a user may be interested in purchasing for him or herself. Human models are used in examples herein, but the techniques provided herein can equally be applied to other models as will be appreciated.

As used herein, the term "body type" refers to the general body shape of the model identified in an image. Example body types include, for instance, rectangular, triangle, hourglass, inverted triangle, and round. Any number of body types can be accommodated by a given fit explore system.

As used herein, the term "target body type" refers to a particular body type inputted by a user interested in seeing images of models wearing, for instance, a particular article of clothing or accessory and having the same inputted body type.

As used herein, the term "model pose" refers to the general pose of the model identified in an image. Example pose types include, for instance, a front view pose, a side view pose, and a back view pose. Any number of pose types can be accommodated by a given fit explore system.

As used herein, the term "target pose" refers to a particular body pose inputted by a user interested in seeing images of models wearing, for instance, a particular article of clothing or accessory and having the same inputted body pose.

As used herein, the term "one or more body type classification layers" refers to one or more layers of a neural network (e.g., hidden layers, fully connected layers) that are configured during training of the neural network to identify and/or classify a body type of a model present in a received image. Such layers have a unique set of weights that result from training, each weight assigned to a neuron or pathway between neurons. It is these weights that characterize the network's intelligence and ability to infer body type.

As used herein, the term "one or more pose classification layers" refers to one or more layers of a neural network (e.g., hidden layers, fully connected layers) that are configured during training of the neural network to identify and/or classify a pose of a model present in a received image. Such layers have a unique set of weights that result from training, each weight assigned to a neuron or pathway between neurons. It is these weights that characterize the network's intelligence and ability to infer body pose.

General Overview

As noted above, making an online purchasing decision for an article of clothing or accessary is difficult when the user is unsure of how the article of clothing or accessory will look on his or her body. Users are either left to guess how the clothing or accessory will look, or can view the clothing article or accessory being worn by pre-selected models that likely do not represent their own body type. Thus, apparel visualization based on the user's body type is lacking for most users, particularly for those that do not have a typical model body. In addition, it is costly to provide images of each article of clothing or accessory being worn or used by different models in different poses. Furthermore, and as previously explained, existing image retrieval systems do not allow a user to search for an image depicting a specific product being worn by a model having a specific body type or pose. Thus, retrieving specific images depicting a desired product being worn by a model having particular a body type and pose is not possible. The present disclosure provides techniques that address these underlying problems, by leveraging user generated content to collect a large number of images of models of varying body types and poses followed by using neural networks trained to identify particular model characteristics to classify each of the received images based at least on the model's body type and pose.

Providing a user the ability to view images of models having his or her body type in a pose requested by the user wearing a particular article of clothing or accessory requires a solution that is adaptable and able to leverage content received from a variety of different sources. Thus, and in accordance with some embodiments, the techniques discussed herein use neural networks to analyze product images uploaded by users (UGC). Specifically, the neural networks are trained to identify a body type and pose of the model in each of the uploaded images so that the images can be labeled and organized based on the model's body type and pose. The images can also undergo some image processing operations to enhance the usefulness of the image, such as automatically cropping the image around the model by identifying the location of the model via a bounding box generated by another neural network. The neural networks also provide adaptability in the form of unsupervised learning to identify new body types and/or poses and organize images with the newly identified body types and/or poses accordingly. According to some embodiments, the neural networks are utilized to transform unlabeled or unclassified images into labeled or classified images that can be grouped or identified according to the body types and/or poses of the models in the images.

The techniques may be embodied in devices, systems, methods, or machine-readable mediums, as will be appreciated. For example, according to a first embodiment of the present disclosure, a system is provided that is configured to determine a body type and a pose of models in a plurality of images. The system includes at least one processor and various modules executable by the processor(s) to carry out the process of enhancing the online apparel browsing experience. The modules include an image processing module, a model classification module, an input module, and an output module. The image processing module identifies an association between one or more images of the plurality of images. Each of the images includes a model with a same article of clothing or accessory and the association is based on the same article of clothing or accessory present in each image. The model classification module classifies a body type of the model depicted in each of the images using a first neural network having one or more body type classification layers and classifies a pose of the model depicted in each of the images using a second neural network having one or more pose classification layers. The input module receives a request from a user for an image having a model with the same article of clothing or accessory. The request designates a target body type and a target pose. The output module causes display of at least a portion of one or more of the one or more images classified with the target body type and the target pose. The displayed image may be a cropped version of the originally received image that has been cropped down around the model. In some embodiments, received images may be cropped using another neural network that is trained to identify the location of the model in the image and generate a bounding box around the model.

According to another embodiment of the present disclosure, a method is provided for determining a body type and a pose of models in a plurality of images. The method includes classifying a model body type depicted in each of one or more images of the plurality of images using a first neural network having one or more body type classification layers, each of the one or more images including a model with a same article of clothing or accessory; classifying a model pose depicted in each of the one or more images using a second neural network having one or more pose classification layers; receiving one or more requests from a user for an image having a model with the same article of clothing or accessory, the one or more requests including a target body type and a target pose; and causing display of at least a portion of one or more of the one or more images classified with the target body type and the target pose.

Numerous examples are described herein, and many others will be appreciated in light of this disclosure. For example, although many of the examples herein refer to using the disclosed techniques to help a user visualize an article of clothing on his or her body, the same techniques can be equally applied to other objects, such as accessories that are worn on the body.

Example Use Scenario

FIGS. 1A-1D each show a user interface of a fit explore system configured in according with an embodiment of the present disclosure. The user interface is in the form of an online browser window 100, which can be accessed or otherwise executed in the context of any browser application. As can be seen in these example use cases, each of FIGS. 1A-1D illustrates an example view of an online website selling an article of clothing. It should be understood that the views and specific details of the website can vary from one embodiment to the next. Other examples of laying out similar components with the same functionality would be readily apparent in light of this disclosure.

FIG. 1A illustrates a browser window 100 that shows an online website for browsing and purchasing clothing. Browser window 100 includes a view of a particular model 102 wearing an article of clothing 104 that is being advertised. Browser window 100 also includes product details 106 that can include a variety of different details about clothing 104, such as its price, measurements, color options, description, reviews, etc. Product details 106 may also include buttons to allow a user to add clothing 104 to a virtual shopping bag or add clothing 104 to a wishlist for later viewing. Model 102 is presented as an image provided by the seller or the website and does not change. Accordingly, model 102 may not provide an accurate representation of how clothing 104 will look on a user if that user does not have the same body type as model 102.

According to some embodiments, browser window 100 includes an explore fit field 108. Explore fit field 108 may include graphics or other attention-getting mechanisms to stand out and showcase that the user has the option of using its functionality to view other models wearing the same clothing 104. In some embodiments, explore fit field 108 is located directly beneath the image of model 102 as illustrated in FIG. 1A. Explore fit field 108 may include some text that explains its function, which may be helpful for new users that have not used it in the past. According to some embodiments, explore fit field 108 includes its own start button 110 that can be clicked (or touched) to activate the fit explore system that queries the user for their desired body type and pose, and provides the user with images of models wearing clothing 104 that have the selected body type and pose. In some other embodiments, the entire explore fit field 108 can be clicked or touched to activate the fit explore system.

Figure 1B:
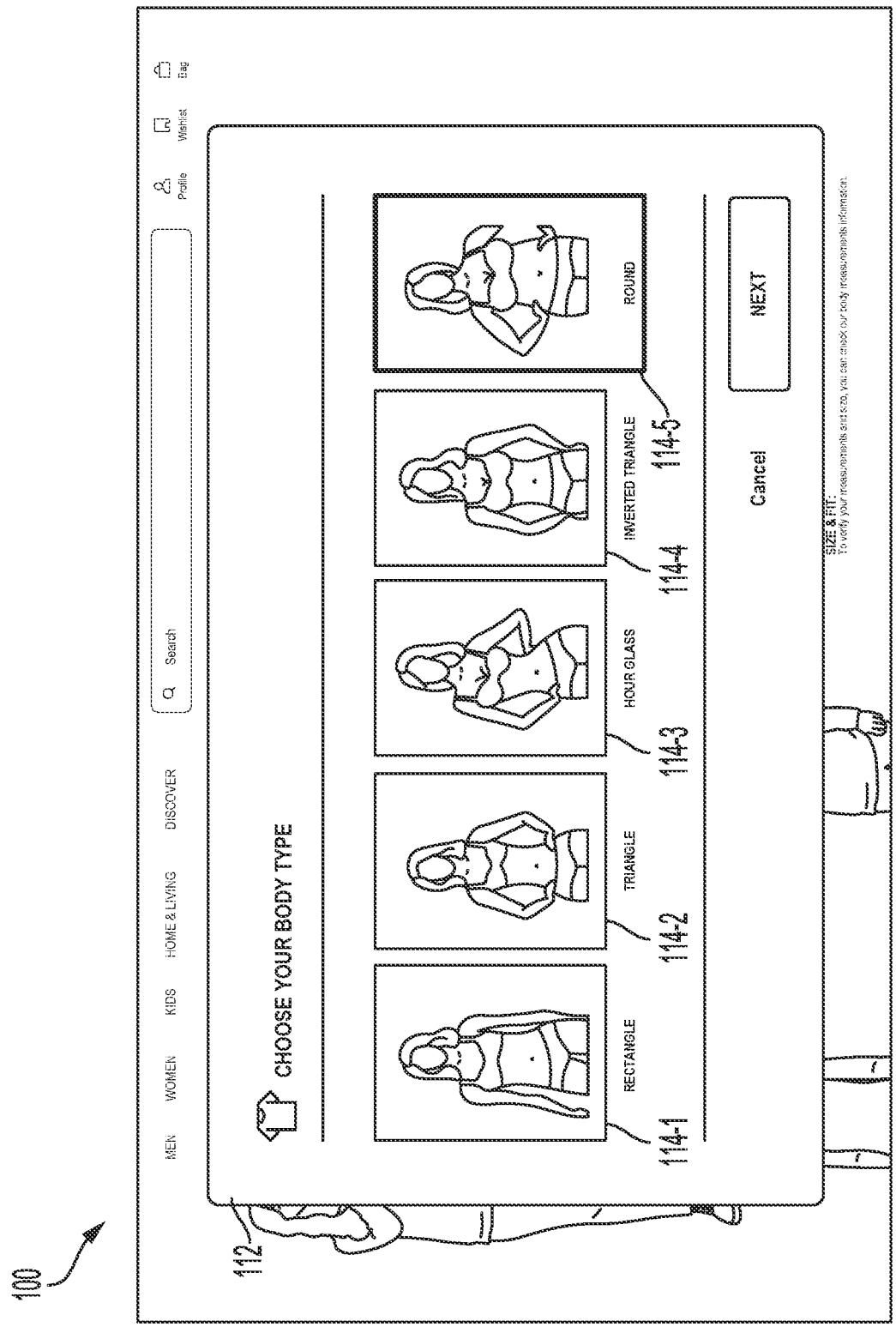

FIG. 1B illustrates browser window 100 after activating the fit explore system by clicking or touching in explore fit field 108, according to an embodiment. In some examples, a pop-up window 112 is generated to display various body type choices for the user. In some other examples, clicking or touching in explore fit field 108 opens a new browser window to display various body type choices for the user. Any number of pre-determined body types can be provided for the user. In the illustrated example, five different body types are provided for the user to view and select. The five body types provided here are rectangular 114-1, triangle 114-2, hourglass 114-3, inverted triangle 114-4, and round 114-5. According to some embodiments, each of the different body types is accompanied by an avatar to graphically depict a generic take on each body type. The user can select any one of the depicted body types. In some embodiments, selecting a particular body type highlights or otherwise graphically emphasizes that choice and the user then clicks or touches a "next" button to continue on. In some embodiments, the act of selecting a particular body type causes the fit explore system to continue onwards.

Figure 1C:
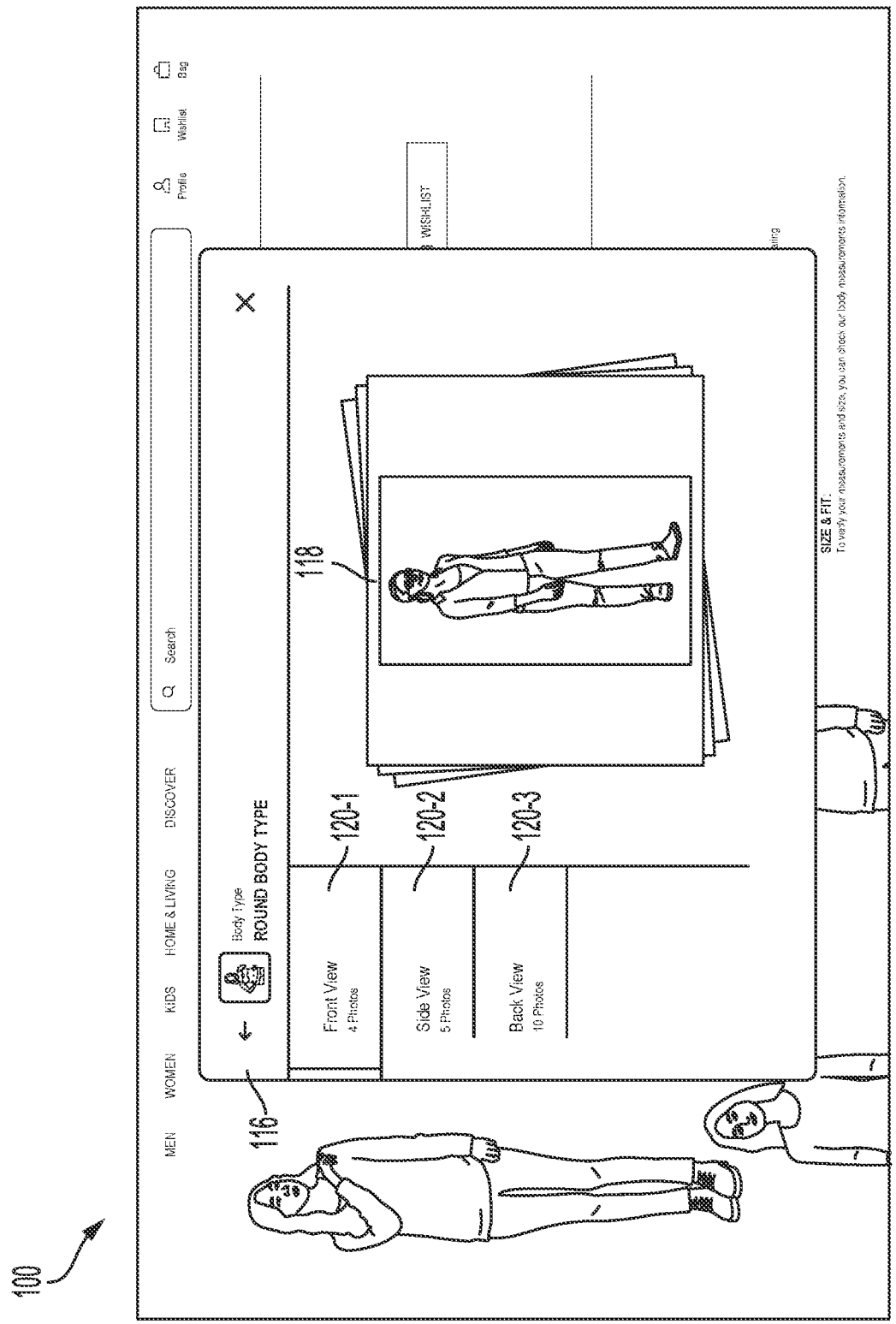

FIG. 1C illustrates browser window 100 after a user has selected a body type. In the illustrated example, the user has selected the "round" body type as indicated at the top of a pop-up window 116. According to some embodiments, pop-up window 116 displays a collection of images 118 of models having the selected body type along with options for a user to select a pose for the models. Pop-up window 116 may be a different pop-up window than pop-up window 112, or the same pop-up window is used and changes what it displays.

Collection of images 118 may be represented in any number of different ways, as will be appreciated. For example, collection of images 118 can show one image as a top image on a stack of other images beneath it, as illustrated in FIG. 1C. A user may click or touch the stack of images to expand the images out and see all of the images within collection of images 118 as thumbnails or as full-sized images. In another example, collection of images 118 is presented in such a way that all images within the collection are visible using an array of image thumbnails. Any method of providing the collection of images for viewing can be used, as would be apparent to one skilled in the relevant art.

According to some embodiments, a user is also presented with a choice of different poses for the models wearing clothing 104. In the illustrated example, a user can select a front view pose 120-1, a side view pose 120-2, and a back view pose 120-3. The user may make a pose selection by clicking or touching one of the presented pose options. In some embodiments, additional pose selections can also be made for differentiating between sitting or standing models, as one example. In some embodiments, selecting a particular pose highlights or otherwise graphically emphasizes that choice and the user then clicks or touches a "next" button to continue on. In some embodiments, the act of selecting a particular pose causes the fit explore system to continue onwards.

Figure 1D:
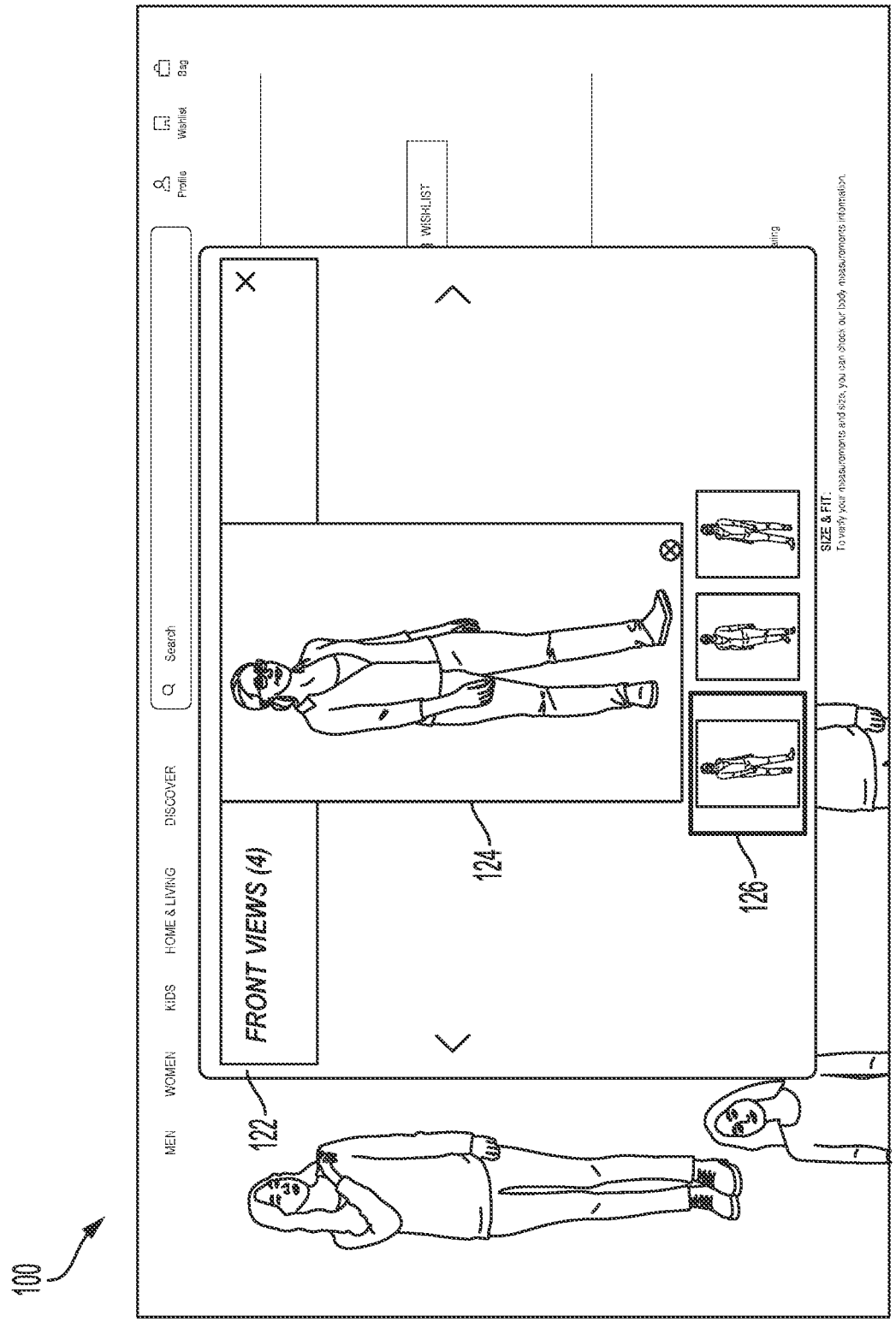

FIG. 1D illustrates browser window 100 after a user has selected a pose. In the illustrated example, the user has selected the "front view" pose as indicated at the top of a pop-up window 122. According to some embodiments, pop-up window 122 displays a full-sized version of an image 124 with a model of the selected body type and pose along with thumbnails 126 of different images of models having the selected body type and pose. Pop-up window 122 may be a different pop-up window than pop-up window 116, or the same pop-up window is used and changes what it displays.

According to some embodiments, pop-up window 122 indicates the total number of provided images of models having the selected body type and pose (in the illustrated example, the total number of images is four, as indicated in parenthesis). A user may select a different image from thumbnails 126 to view a full-sized version of the selected image.

System Architecture

Figure 2:
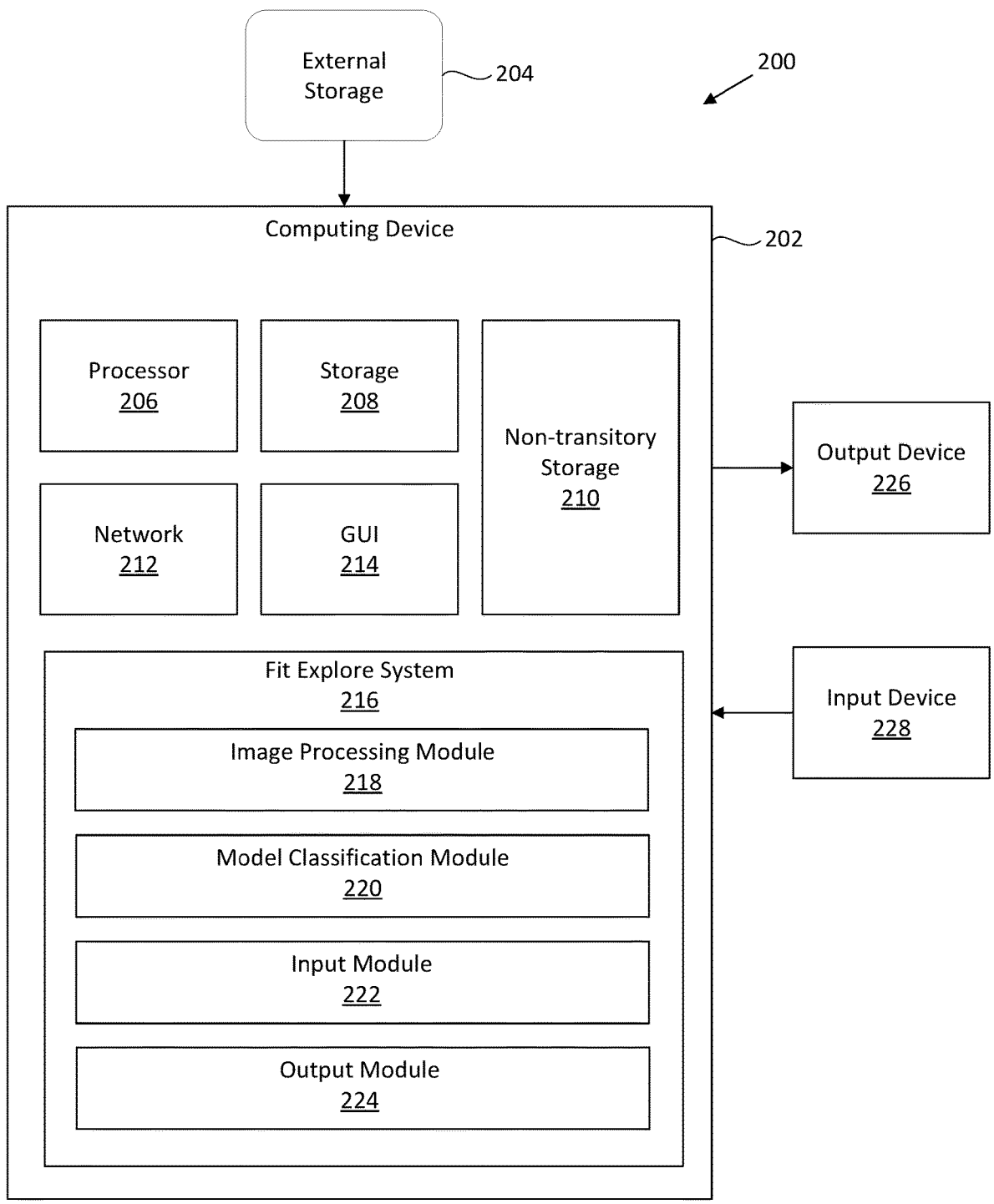
FIG. 2 shows an example system having a fit explore system, configured in accordance with an embodiment of the present disclosure.

FIG. 2 shows an example system 200 that, among other things, implements a fit explore system 216 to retrieve certain images based on user queries, according to an embodiment. The system 200 includes various hardware components such as a computing device 202 having a processor 206, a storage 208, a non-transitory storage medium 210, a network interface 212, and a graphical user interface (GUI) 214. As will be appreciated, fit explore system 216 may be part of a more comprehensive web application. GUI 214 may include a display and a user input device. In some embodiments, GUI 214 represents a command-line interface. In some embodiments, computing device 202 represents a web server or any other type of networked computing system that analyzes and organizes user uploaded images of clothing products in order to provide images that meet user-received criteria regarding model body type and pose. In this way, computing device 202 communicates with other networked computing devices to receive input (e.g., user input of model type and pose) from such devices and provide output (images having models that match the user input) to such devices.

According to some embodiments, processor 206 of the computing device 202 is configured to execute the following modules of fit explore system 216, each of which is described in further detail below: image processing module 218, model classification module 220, input module 222, and output module 224. In some embodiments, computing device 202 is configured to store user-uploaded images in external storage 204 or in storage 208. External storage 204 may be local to device 202 (e.g., plug-and-play hard drive) or remote to device 202 (e.g., cloud-based storage), and may represent, for instance, a stand-alone external hard-drive, external FLASH drive or any other type of FLASH memory, a networked hard-drive, a server, or networked attached storage (NAS), to name a few examples. As will be discussed in more detail herein, each of the modules 218, 220, 222, and 224 are used in conjunction with each other to complete a process for retrieving particular images that enhance an online apparel browsing experience. Note that other embodiments may have fewer modules or more modules. For instance, all of the functionality described could be carried out in one single module, according to some embodiments. Likewise, the function attributed to one module in one embodiment may be carried out by another module in another embodiment. For instance, image cropping can be performed by module 218 in some embodiments and may be performed by module 220 in some other embodiments. Numerous such variations will be apparent. To this end, the degree of modularity or integration may vary from one embodiment to the next, and the example modules provided are not intended to limit the present disclosure to a specific structure.

Computing device 202 can be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), virtual reality (VR) device or VR component (e.g., headset, hand glove, camera, treadmill, etc.) or other form of computing or telecommunications device that is capable of communication and that has sufficient processor power and memory capacity to perform the operations described in this disclosure. A distributed computational system can be provided including a plurality of such computing devices. Further note that device 202 may be, for example, a client in a client-server arrangement, wherein at least a portion of the fit explore system 216 is served or otherwise made accessible to device 202 via a network (e.g., the Internet and a local area network that is communicatively coupled to the network interface 212).

Computing device 202 includes one or more storage devices 208 or non-transitory computer-readable mediums 210 having encoded thereon one or more computer-executable instructions or software for implementing techniques as variously described in this disclosure. The storage devices 208 can include a computer system memory or random access memory, such as a durable disk storage (which can include any suitable optical or magnetic durable storage device, e.g., RAM, ROM, Flash, USB drive, or other semiconductor-based storage medium), a hard-drive, CD-ROM, or other computer readable mediums, for storing data and computer-readable instructions or software that implement various embodiments as taught in this disclosure. The storage device 208 can include other types of memory as well, or combinations thereof. The non-transitory computer-readable medium 210 can include, but are not limited to, one or more types of hardware memory, non-transitory tangible media (for example, one or more magnetic storage disks, one or more optical disks, one or more USB flash drives), and the like. The non-transitory computer-readable medium 210 included in the computing device 202 can store computer-readable and computer-executable instructions or software for implementing various embodiments (such as instructions for an operating system as well as neural network operations that are a part of fit explore system 216). The computer-readable medium 210 can be provided on the computing device 202 or provided separately or remotely from the computing device 202.

The computing device 202 also includes at least one processor 206 for executing computer-readable and computer-executable instructions or software stored in the storage device 208 or non-transitory computer-readable medium 210 and other programs for controlling system hardware. Processor 206 may have multiple cores to facilitate parallel processing or may be multiple single core processors. Any number of processor architectures can be used (e.g., central processing unit and co-processor, graphics processor, digital signal processor). Virtualization can be employed in the computing device 202 so that infrastructure and resources in the computing device 202 can be shared dynamically. For example, a virtual machine can be provided to handle a process running on multiple processors so that the process appears to be using only one computing resource rather than multiple computing resources. Multiple virtual machines can also be used with one processor. Network interface 212 can be any appropriate network chip or chipset which allows for wired or wireless connection between the computing device 202 and a communication network (such as local area network) and other computing devices and resources.

A user can interact with the computing device 202 through a networked output device 226, such as a screen or monitor, which can display options for a user to select or images of models having a user-selected body type and pose, as provided in accordance with some embodiments. Computing device 202 can include networked input or input/output devices 228 for receiving input from a user, for example, a keyboard, a joystick, a game controller, a pointing device (e.g., a mouse, a user's finger interfacing directly with a touch-sensitive display device, etc.), voice input, or any suitable user interface, including an AR headset. The computing device 202 may include any other suitable conventional I/O peripherals. In some embodiments, computing device 202 includes or is operatively coupled to various suitable devices for performing one or more of the aspects as variously described in this disclosure.

The computing device 202 can run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 202 and performing the operations described in this disclosure. In an embodiment, the operating system can be run on one or more cloud machine instances.

In other embodiments, the functional components/modules can be implemented with hardware, such as gate level logic (e.g., FPGA) or a purpose-built semiconductor (e.g., ASIC). Still other embodiments can be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as fit explore system 216, image processing module 218, model classification module 220, input module 222, output module 224, GUI 214, or any combination of these, may be implemented in software, such as a set of instructions (e.g., HTML, XML, C, C++, object-oriented C, JavaScript®, Java®, BASIC, etc.) encoded on any machine-readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by one or more suitable processors in any number of configurations and arrangements, and that the depicted embodiments are not intended to be limiting. Various components of this example embodiment, including the computing device 202, can be integrated into, for example, one or more desktop or laptop computers, workstations, tablets, smart phones, game consoles, VR devices, set-top boxes, or other such computing devices. Other componentry and modules typical of a computing system, will be apparent.

According to some embodiments, image processing module 218 is configured to receive images uploaded from various sources and organize the images based on the clothing product depicted in the images. For example, images may be received from users of themselves or someone they know wearing a particular article of clothing. The images may be uploaded in a comment section of a webpage on an online website dedicated to advertising that particular article of clothing. In some other examples, images may be uploaded via a specific request provided by the website for users to upload their own images of the clothing product. Accordingly, image processing module 218 would organize together or otherwise associate all images uploaded from the website dedicated to the particular article of clothing. The images may be labeled (e.g. by editing image metadata) with the article of clothing being depicted. In some embodiments, all images labeled in some fashion as having a model wearing the same article of clothing are stored together for quicker access at a later time.

According to some embodiments, image processing module 218 performs one or more image processing operations on the received images. For example, dark images can be brightened, or some image aberrations can be corrected. In some embodiments, the images are cropped down around the model to cut out unnecessary portions of the image. The cropping operation involves inputting the received images into a neural network trained to identify the location of a person in the image. Once the location is determined, a bounding box is generated around the person and is used to crop the image down to at least the bounding box boundaries. Further details of how the received images are organized and processed are provided herein with reference to FIG. 5.

According to some embodiments, model classification module 220 is configured to classify the images received of a given article of clothing based on characteristics of the model in the image wearing the article of clothing. The classification is performed using one or more neural networks trained to identify at least the body type and pose of the model in each of the received images. In some examples, a single neural network is trained to classify both the body type and pose of the model in a received image. However, focusing on classifying more than one aspect may be cumbersome for a single neural network. Thus, in some examples, a first convolutional neural network (CNN) is trained to classify the body type of the model in a received image and a second CNN is trained to classify the pose of the model in the received image. Each of the CNNs may be trained in a supervised fashion using hundreds or thousands of pre-labeled images to teach the CNNs how to identify certain predetermined body types and poses. Examples of pre-determined body types include rectangular, triangular, hourglass, inverted triangular, and round body types. Examples of poses include front view, side view, and back view. In some embodiments, sitting and standing poses are also identified by the second CNN, such that each of the front, side, and back views also have sitting or standing classifications. In some embodiments, the images are organized again (e.g., stored or clustered together) based on their classified body type and pose for quick access to all of the images classified with a given body type and pose. Further details of the CNNs and how they are configured to identify body type and pose of a model in a received image are provided herein with reference to FIG. 3.

According to some embodiments, either or both the first and second CNNs can also adaptively learn new body types and poses in an unsupervised manner. When receiving enough images with a body type or pose that does not match one of the pre-determined ones, the CNNs can identify the new body type or pose and assign a new body type or pose classification to each image that has that same body type or pose. These may be presented to users separately from those images classified with the pre-determined body types and poses, according to some embodiments. Further details of how the received images are classified based on at least body type and pose are provided herein with reference to FIG. 6.

According to some embodiments, input module 222 is configured to receive user input to request images having models with a selected body type and pose. The input may be provided via mouse clicks or touchscreen touches on a web interface that displays the article of clothing being advertised as illustrated, for example, in FIGS. 1A-1D. The user input is received through an interface associated with a particular article of clothing, such as a website that is advertising the particular article of clothing. Input may also be provided via any other known means for interacting with a computing device, such as voice commands or hand gestures. According to some embodiments, input module 222 also receives requests for viewing enlarged versions of selected images (e.g., selected image thumbnails). Examples of graphical prompts provided to a user for receiving input regarding body type and/or pose of models wearing a particular article of clothing are illustrated, for example, in FIGS. 1B and 1C. Further details of the operations of input module 222 are provided herein with reference to FIG. 4.

According to some embodiments, output module 224 is configured to display those images of a model having the user-selected body type and pose and wearing a particular article of clothing. The actual display of the images can be performed in any number of ways, with one example graphically represented in FIGS. 1C and 1D. The images may be provided on a screen coupled to computing device 202 or on a screen that is networked with computing device 202. In some embodiments, cropped versions of the received images are ultimately displayed.

Figure 3:
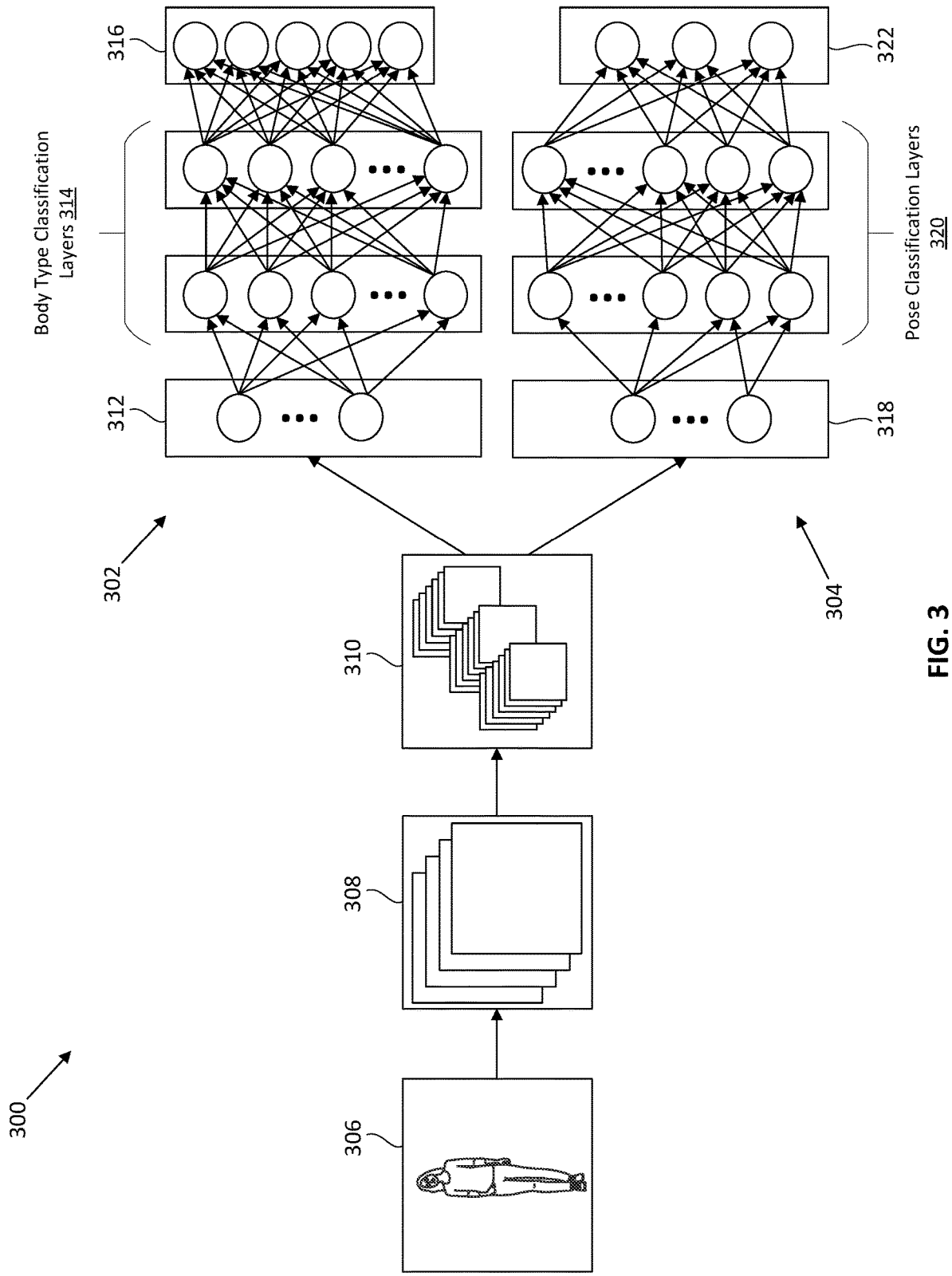
FIG. 3 illustrates an example feature detection system that is a component of the fit explore system of FIG. 2, in accordance with some embodiments of the present disclosure.

FIG. 3 illustrates an image feature detection system 300, according to an embodiment. Specifically, image feature detection system 300 uses a first neural network 302 to identify the body type of a model depicted within an input image 306, and a second neural network 304 to identify the pose of the model depicted within the input image 306. In some such embodiments, image feature detection system 300 is a component of model classification module 220 of FIG. 2.

Input image 306 represents any received image of a model wearing a particular article of clothing, according to some embodiments. As noted above, the image may be, for example, provided by a seller, or user generated content such as an image provided by a previous purchaser of the article of clothing. In the latter case, for instance, input image 306 may be uploaded in a comment section of a webpage on an online website dedicated to advertising that particular article of clothing. In some other examples, input image 306 may be uploaded via a specific request provided by the website for users to upload their own images of the clothing product. Any number of crowd-sourced images can be used.

One or more filters are applied to input image 306 by one or more convolutional layers 308, according to some embodiments. More specifically, one or more convolutional layers 308 break down input image 306 into various filtered feature maps that identify locations and relative strengths of detected features in the image. The same filter can be systematically applied across different sections of input image 306, which allows for the detection of salient image features regardless of their location in input image 306. In this application, the salient image features are those associated with the model, particularly with respect to body type and pose.

According to some embodiments, pooling layers 310 are used to further down sample the detected features from the feature maps generated by one or more convolutional layers 308. In essence, pooling layers 310 operate on the individual feature maps to generate smaller pooled feature maps. The pooled feature maps summarize the feature data from the feature maps. According to some embodiments, the resulting pooled feature maps are more robust to any changes in position of the salient features from input image 306.

Once the feature maps or pooled feature maps have been generated from input image 306, the feature map data is fed as input to first neural network 302 and second neural network 304. First neural network 302 includes an input layer 312, one or more body type classification layers 314, and an output layer 316. Second neural network 304 similarly includes an input layer 318, one or more pose classification layers 320, and an output layer 322. Note in other embodiments that first neural network 302 may include its own dedicated convolutional layers 308 and pooling layers 310, as may second neural network 304. In any such cases, each of the layers of first neural network 302 and second neural network 304 include neurons that represent mathematical functions and/or weights applied to data received as input to the neuron. The output of a neuron of one layer is received by each of the neurons in the proceeding layer. Accordingly, input layer 312 of first neural network 302 and input layer 318 of second neural network 304 can include any number of neurons that receive the image feature data from the pooled feature maps.

According to some embodiments, body type classification layers 314 are configured during training of first neural network 302 to identify the body type of the model based on the model features encapsulated in the pooled feature maps. The number of body type classification layers 314, the number of neurons in each of the layers, and the function performed by each neuron are established during supervised training as first neural network 302 learns how to identify different pre-determined body types based on the image features of the model. Accordingly, the characteristics (e.g., number of layers, number of neurons in a given layer, etc.) of body type classification layers 314 can be different depending on various training factors. According to some embodiments, output layer 316 includes a number of neurons equal to the number of possible predetermined body types. In the illustrated example, output layer 316 includes five neurons corresponding to five pre-determined body types (e.g., rectangular, triangular, hourglass, inverted triangular, and round).

According to some embodiments, pose classification layers 320 are configured during training of second neural network 304 to identify the pose of the model based on the model features encapsulated in the pooled feature maps. The number of pose classification layers 320, the number of neurons in each of the layers, and the function performed by each neuron are established during supervised training as second neural network 304 learns how to identify different pre-determined poses based on the image features of the model. Accordingly, the characteristics (e.g., number of layers, number of neurons in a given layer, etc.) of pose classification layers 320 can be different depending on various training factors. According to some embodiments, output layer 322 includes a number of neurons equal to the number of possible predetermined poses. In the illustrated example, output layer 322 includes three neurons corresponding to three pre-determined poses (e.g., front view, side view, and back view).

Methodology

Figure 4:
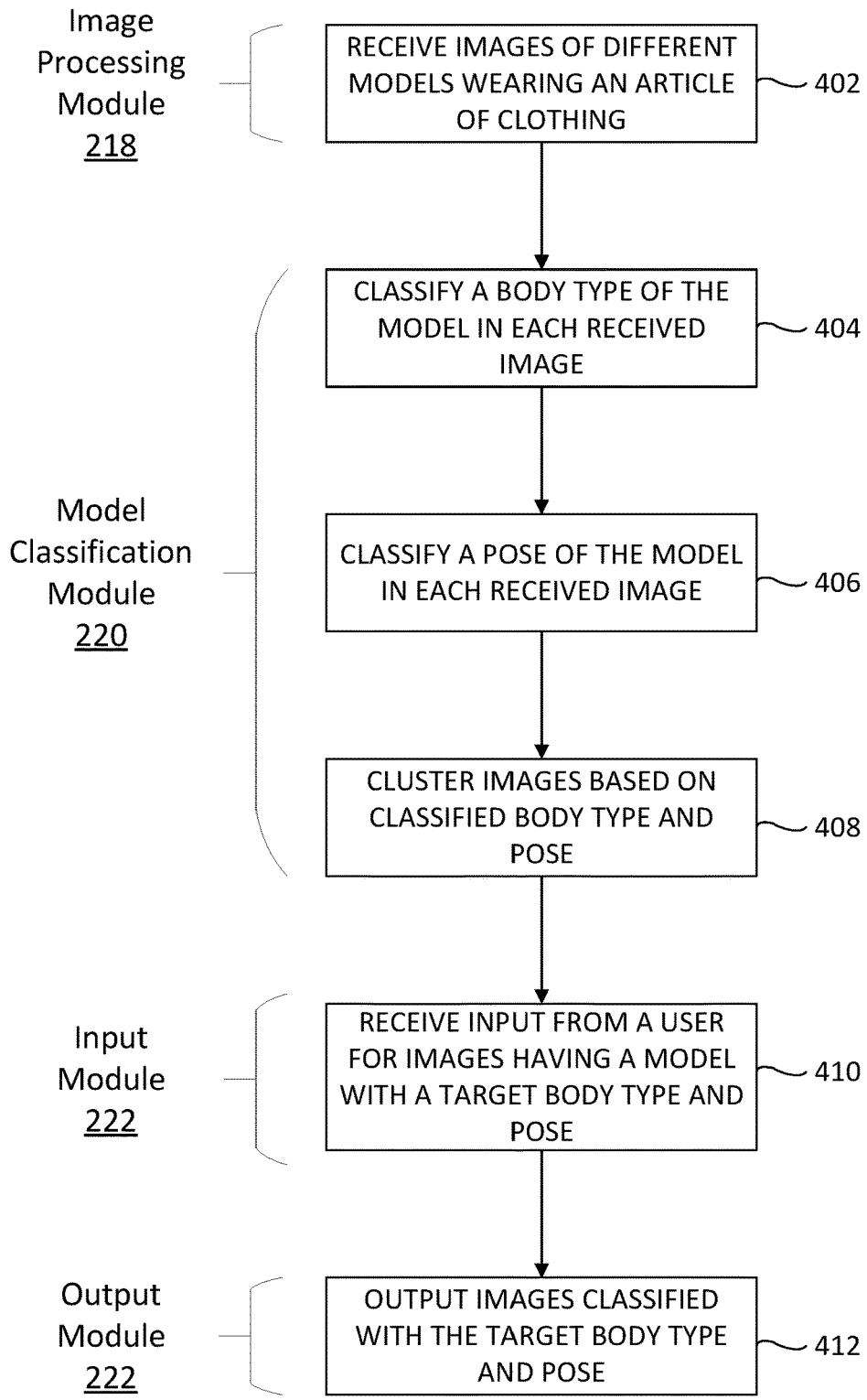
FIG. 4 is a flow diagram of an image retrieval process, configured in accordance with some embodiments of the present disclosure.

FIG. 4 illustrates an example method 400 of enhancing an online apparel browsing experience, according to an embodiment. As discussed above, some of the operations of method 400 are performed upon receiving images uploaded by users of a particular clothing product while other operations are performed upon receiving input from a user to view certain ones of the uploaded images based on user-selected criteria. The operations, functions, or actions described in the respective blocks of example method 400 may be stored as computer-executable instructions in a non-transitory computer-readable medium, such as a memory and/or a data storage of a computing system. In some embodiments, the operations of the various blocks of method 400 are performed by fit explore system 216. As will be further appreciated in light of this disclosure, for this and other processes and methods disclosed herein, the functions performed in method 400 may be implemented in a differing order. Additionally, or alternatively, two or more operations may be performed at the same time or otherwise in an overlapping contemporaneous fashion.

At block 402, images of different models wearing the same article of clothing are received from any number of users. According to some embodiments, the operations of block 402 are performed by image processing module 218. The images may be photographs taken by the users of themselves or someone else wearing the article of clothing, which are then uploaded via an online website or through any other means of uploading the images to a webserver. In some examples, the images are uploaded by users when posting comments or reviews about the article of clothing on a website that is advertising the sale of the article of clothing. In other examples, the images are uploaded by different users via a specific request provided by the website for the users to upload their own images of the article of clothing.

Since the images of the same article of clothing are uploaded via a common website or across various websites associated in some way with the article of clothing, the uploaded images can be labeled or otherwise identified as being associated with the article of clothing. The images may be received at a centralized computing device or devices, such as a webserver. Other image processing operations may be performed on the received images, such as cropping the images to focus on the model in each image. According to some embodiments, the images are input into a neural network that identifies the location of the model in the image with a bounding box around the model. The image may then be cropped around the bounding box to yield a cropped image focused more on the model. When the images are cropped, the cropped versions of the uploaded images may be used as input to the neural networks for classifying the body type and pose of the model in each of the cropped images.

According to some embodiments, any number of image identification techniques can be used to eliminate uploaded images that clearly do not include a model wearing an article of clothing. For example, a neural network can be trained to identify the presence of a person in the uploaded images, and any image that does not have a person in it can be immediately discarded. Some more advanced techniques can even identify if the article of clothing worn by the person in the image matches the correct article of clothing (e.g., the article of clothing associated with the website where the images are uploaded). Feature matching techniques can be used to determine if enough features of the article of clothing in an uploaded image matches the article of clothing in another image that is known to have the correct article of clothing. Example feature matching techniques include scale-invariant feature transform (SIFT), speeded up robust features (SURF), or oriented FAST and BRIEF (ORB). According to some embodiments, the article of clothing in an uploaded image is considered to be a robust match for the correct article of clothing if a threshold percentage of features are found to match. The threshold percentage may be 65%, 70%, 75%, 80%, 85%, 90%, 95%, or 100%, depending on how sensitive the match is desired to be. Further details regarding how received images can be processed are provided herein with reference to FIG. 5.

At block 404, a body type of the model in each of the received images is classified using a neural network. According to some embodiments, the operations of block 404 are performed by model classification module 220. More specifically, and in accordance with some embodiments, a received image is broken up into feature maps and fed as an input to a first CNN (such as first neural network 302) trained to classify the body type of the model. More specifically, one or more body type classification layers of the first CNN are configured during training to identify and classify the body type of the model in a received image. The first CNN outputs a body type classification of the model from any number of pre-determined body types. The first CNN may be trained using a labeled set of thousands of inputted images that contain the most common model views (e.g., side, front, back). The labels provide the body type of the model in the training images, thus training the CNN to identify certain pre-determined body types. Example body types include rectangular, triangular, hourglass, inverted triangular, and round body types. The first CNN can be trained to identify any number of different body types. Furthermore, according to some embodiments, the first CNN can train itself in an unsupervised fashion where it learns to recognize new body types if the model does not fit into one of the pre-determined body types. The recognition of new body types is manifested as a reconfiguration of the one or more body type classification layers of the first CNN, such that they include a new function or functions capable of identifying and classifying the new body type based on the image features. Further details regarding the process of classifying the body type of the model in one or more received images are provided herein with reference to FIG. 6.

At block 406, a pose of the model in each of the received images is classified using a neural network. According to some embodiments, the operations of block 406 are performed by model classification module 220. More specifically, and in accordance with some embodiments, a received image is broken up into feature maps and fed as an input to a second CNN (such as second neural network 304) trained to classify the pose of the model. More specifically, one or more pose classification layers of the second CNN are configured during training to identify and classify the pose of the model in a received image. The second CNN outputs a pose classification of the model from any number of pre-determined poses. The second CNN may be trained using a labeled set of thousands of inputted images that contain the most common views (e.g., side, front, back). The labels provide the pose of the model in the training images, thus training the CNN to identify certain pre-determined poses. According to some embodiments, the second CNN outputs both a view and a posture that together make up the pose of the model. Example views include front, side, and back views while example postures include sitting or standing. Thus, example poses include front view standing, front view sitting, side view standing, side view sitting, back view standing, and back view sitting. The second CNN can be trained to identify any number of combinations of different views and postures. Furthermore, according to some embodiments, the second CNN can train itself in an unsupervised fashion where it learns to recognize new poses if the model does not fit into one of the pre-determined poses. The recognition of new poses is manifested as a reconfiguration of the one or more pose classification layers of the second CNN, such that they include a new function or functions capable of identifying and classifying the new pose based on the image features. Further details regarding the process of classifying the pose of the model in one or more received images are provided herein with reference to FIG. 6.

As discussed above, and in accordance with some embodiments, the operations of blocks 404 and 406 provide technical solutions to the technical problem of retrieving particular images having specific features (e.g., product and model body type) from a plurality of images. In this example, each of the images collected from users, or from other sources, wearing a particular article of clothing did not contain any metadata or other identifiers that indicate features of the model, such as the body type and pose of the model. Thus, the neural networks are used to identify such features so that the images can be properly classified or otherwise grouped based on these features.

At block 408, the received images that have been classified based on body type and pose of the model in the images are clustered or otherwise grouped based on their classifications. According to some embodiments, the operations of block 408 are performed by model classification module 220. According to some embodiments, the clustering involves labeling each image (e.g., labeling image metadata) with its associated body type and pose. In some embodiments, clustering involves storing images with the same body type and pose together in some fashion for quicker retrieval at a later time. Generally, the images are labeled and/or stored in any way that distinguishes them from one another based on the classified body type and pose.

It should be noted that the operations performed in each of boxes 402-408 may be considered pre-processing operations that are performed by any computing device before any input is received by a user for images of a models having a desired body type and pose. In other words, these operations set up a database of classified images to be used by the proceeding operations of method 400.

At block 410, an input for images having models with a target body type and pose is received by a user. According to some embodiments, the operations of block 410 are performed by input module 222. The user can provide the input in any number of different ways. The user can select the body type and pose from options displayed on a screen, such as shown in FIGS. 1B and 1C. In some other embodiments, the user can use voice commands to request images with models having a particular body type and pose. In still other embodiments, the user can upload a picture of his or herself as input, where the body type and pose of the uploaded user picture are determined and used as the target body type and pose.

At block 412, images of models wearing the article of clothing that are classified with the target body type and target pose are provided to the user. According to some embodiments, the operations of block 412 are performed by input module 224. The images can be displayed in any number of different ways as illustrated, for example, in FIGS. 1C and 1D. In some embodiments, each of the images of the article of clothing having the target body type and target pose are provided as thumbnails and the user can select one or more of the thumbnails to view the image(s) at full-size. Providing a user with images showing the article of clothing being worn by models that share his or her particular body type allows the user to visualize how the article of clothing would look on his or her body.

Figure 5:
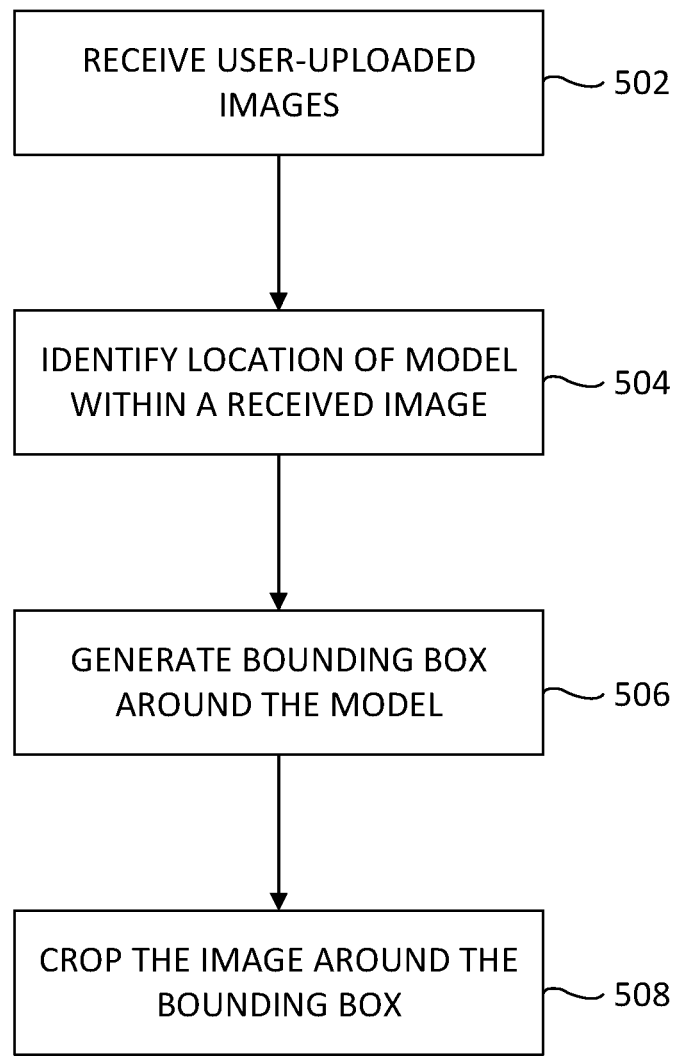
FIG. 5 is a flow diagram of a sub-process of the image retrieval process of FIG. 4, for identifying a location of the model in a given image and cropping the image, in accordance with some embodiments of the present disclosure.

FIG. 5 illustrates an example flowchart providing further operations of block 402 (also referred to herein as method 500) from method 400, according to an embodiment. The operations, functions, or actions described in the respective blocks of example method 500 may be stored as computer-executable instructions in a non-transitory computer-readable medium, such as a memory and/or a data storage of a computing system. As will be further appreciated in light of this disclosure, for this and other processes and methods disclosed herein, the functions performed in method 500 may be implemented in a differing order. Additionally, or alternatively, two or more operations may be performed at the same time or otherwise in an overlapping contemporaneous fashion. According to some embodiments, the functions performed in method 500 are executed by image processing module 218.

Method 500 begins with block 502 where one or more images are received from one or more different users of a model wearing a particular article of clothing. The images may be photographs taken by the users of themselves or someone else wearing the article of clothing, which are then uploaded via an online website or through any other means of uploading the images to a webserver. In some examples, the images are uploaded by users when posting comments or reviews about the article of clothing on a website associated with the article of clothing. In other examples, the images are uploaded by different users via a specific request provided by the website for the users to upload their own images of the article of clothing.

At block 504, the location of the model is identified within each of the received images. According to some embodiments, a neural network is used to identify the location of the model and in the image. The neural network may be another CNN. The CNN is trained using a dataset of training images tagged with bounding box locations of a person in each of the training images. For example, images from a tensor flow library may be used for the training images. According to some embodiments, the CNN used to identify the location of the model functions similarly to first neural network 302 and second neural network 304, as described with reference to FIG. 3.

At block 506, the CNN generates a bounding box around the model within each of the received images. According to some embodiments, the CNN also provides a confidence score to the bounding box. If the confidence score is below a given threshold, then the image is discarded for either being too low quality or for not having a distinguishable model present in the image, according to some embodiments. Similarly, if no model is present in the image then the image is discarded.

The bounding box generated by the CNN may be rectangular in shape and extend far enough to include the full width and height of the model in the image. The bounding box may include coordinates (e.g., X and Y coordinates) to specify its location within the image. According to some embodiments, the CNN may also generate bounding boxes around other objects identified in the image and apply labels to these objects if they are recognized by the CNN. This may be useful for other image processing techniques that, for example, classify the images based on what other objects are present in the images.

At block 508, one or more of the received images are cropped around the bounding box, such that the new cropped image includes only the portion within the bounding box, according to some embodiments. In some other embodiments, the image is cropped to a smaller version that includes at least the portion within the bounding box. As noted previously, the cropped versions of the one or more images may be used during the classification and outputting operations of method 400.

Figure 6:
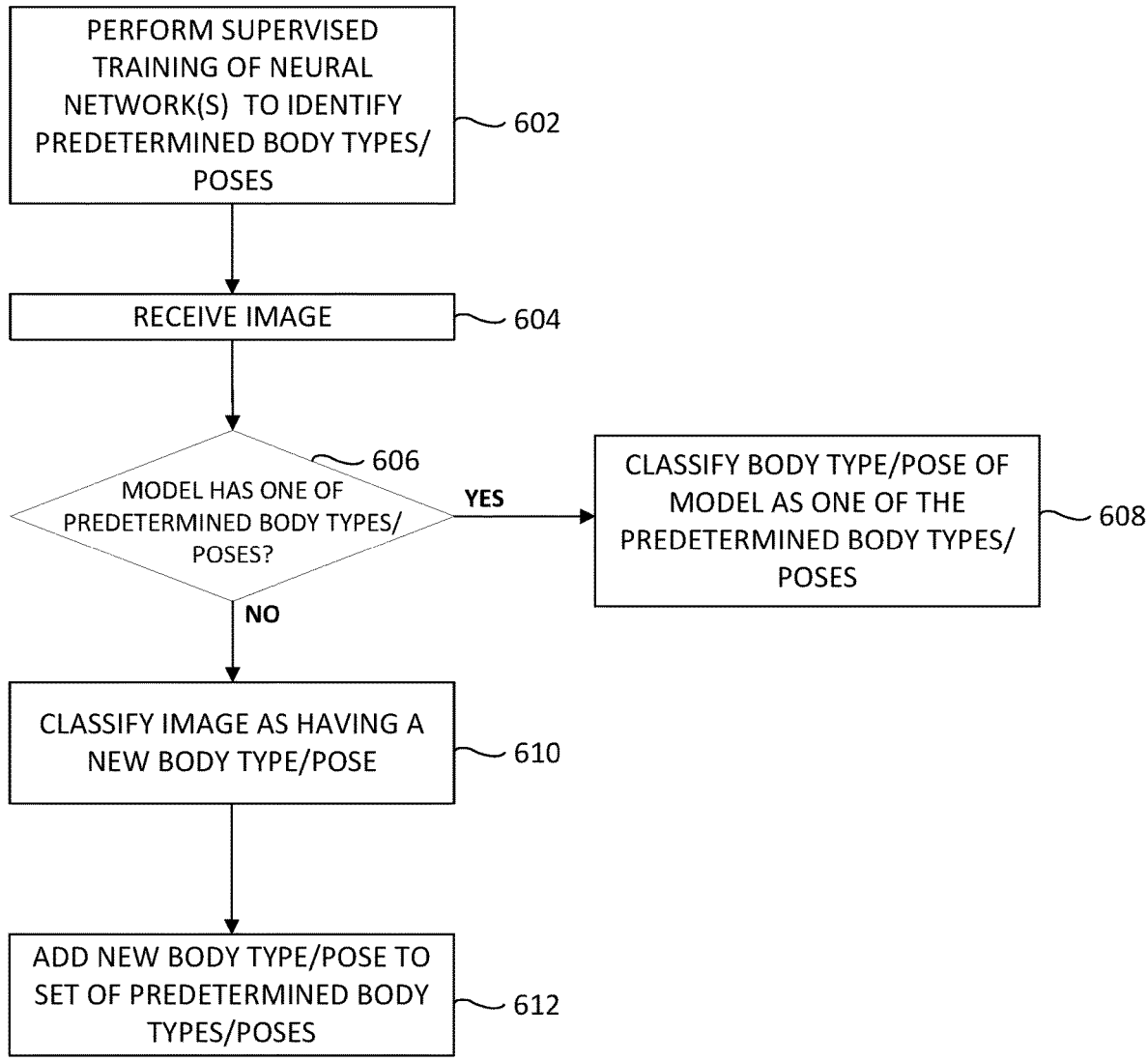
FIG. 6 is a flow diagram of a sub-process of the image retrieval process of FIG. 4, for classifying body type and pose of a model in an image, in accordance with some embodiments of the present disclosure.

FIG. 6 illustrates an example flowchart providing further operations of blocks 404 and 406 (also referred to herein as method 600) from method 400, according to an embodiment. The operations, functions, or actions described in the respective blocks of example method 600 may be stored as computer-executable instructions in a non-transitory computer-readable medium, such as a memory and/or a data storage of a computing system. As will be further appreciated in light of this disclosure, for this and other processes and methods disclosed herein, the functions performed in method 600 may be implemented in a differing order. Additionally, or alternatively, two or more operations may be performed at the same time or otherwise in an overlapping contemporaneous fashion. According to some embodiments, the functions performed in method 600 are executed by model classification module 220.

Method 600 begins with block 602 where supervised training of one or more neural networks is performed to identify a body type and a pose of a model in a received image. In some embodiments, a first neural network is trained to identify the body type of the model in the image and a second neural network is trained to identify the pose of the model in the image. The first neural network may be trained using a labeled set of thousands of inputted images that contain the most common model views (e.g., side, front, back). The labels provide the body type of the model in the training images, thus training the first CNN to identify certain pre-determined body types. With reference to FIG. 3, the first CNN builds its body type classification layers based on the labeled input images. The more images used during the training, the more complex the body type classification layers become and the more accurate the first CNN becomes in correctly identifying the body type of the model in a given input image, according to some embodiments. The second neural network may also be trained with thousands of labeled training images, where the labels provide the pose of the model in the training images, thus training the second CNN to identify certain pre-determined poses. With reference to FIG. 3, the second CNN builds its pose classification layers based on the labeled input images. The more images used during the training, the more complex the pose classification layers become and the more accurate the second CNN becomes in correctly identifying the pose of the model in a given input image, according to some embodiments.

At block 604, an image is received having a model wearing a particular article of clothing. The image may be a photograph taken by the user of his or herself or someone else wearing the article of clothing, which is then uploaded via an online website or through any other means of uploading the image to a webserver.

At block 606, the image (or a cropped version of the image as discussed above) is provided as an input to the first and second CNNs to determine if the model in the image has one of the pre-determined body types and poses. If the model in the image is determined to have one of the pre-determined body types and poses, then method 600 proceeds to block 608 where the image is classified with the determined body type and pose. As noted above, classifying the image with a body type and pose may involve editing metadata of the image to include the body type and pose of the model in the image. If, however, the first and second CNNs cannot match the body type and/or pose of the model in the image with one of the pre-determined body types and poses, the method 600 proceeds to block 610.

At block 610, the image is classified as having either a new body type, new pose, or both a new body type and a new pose. This represents a form of unsupervised training, where the first and second CNNs can adapt to new body types and poses and learn to recognize the new body types and poses in subsequent images. In some embodiments, this adaptation involves changes made to one or both of the body type classification layers and the pose classification layers to identify the new body type and/or pose in future images. In some embodiments, an additional output neuron is created in the first CNN corresponding to a new body type and/or an additional output neuron is created in the second CNN corresponding to a new pose. Accordingly, at block 612, the new body type and/or new pose is added to the predetermined body types and/or poses so that the first and second CNNs may later identify the new body type and/or pose of the models in subsequently received images. In this way, the first and second CNNs may adaptively learn any number of new body types and/or poses to use for classifying the models in the received images.

According to some embodiments, the technical solution to the image retrieval problems noted herein is enhanced by using both supervised and unsupervised learning to train the neural networks. In particular, and as previously explained, predetermined body types and poses can be identified with high certainly by training the neural networks in a supervised fashion, while new body types and poses can still be captured during unsupervised operation. Accordingly, classifications can be provided to each image regardless of whether the model in the image has one of the predetermined body types and/or poses.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

FURTHER EXAMPLE EMBODIMENTS

The following examples pertain to further embodiments, from which numerous permutations and configurations will be apparent.

Example 1 is a method for determining a body type and a pose of models in a plurality of images. The method includes classifying, using a model classification module, a model body type depicted in each of one or more images of the plurality of images using a first neural network having one or more body type classification layers, each of the one or more images including a model with a same article of clothing or accessory; classifying, using the model classification module, a model pose depicted in each of the one or more images using a second neural network having one or more pose classification layers; receiving, using an input module, a request from a user for an image having a model with the same article of clothing or accessory, the request including the target body type and the target pose; and causing, using an output module, display of at least a portion of one or more of the one or more images classified with the target body type and the target pose.

Example 2 includes the subject matter of Example 1, wherein the one or more images includes images previously uploaded by one or more other users.

Example 3 includes the subject matter of Example 1 or 2, wherein the first neural network is a supervised convolutional neural network (CNN) trained to classify a body type of a model depicted in a given image, and the second neural network is a supervised CNN trained to classify a pose of a model depicted in a given image.

Example 4 includes the subject matter of Example 3, wherein the second neural network is further trained to identify a previously unclassified pose for a model depicted in the given image, and generate a new pose classification for the model depicted in the given image.

Example 5 includes the subject matter of any one of Examples 1-4, and further including receiving, using an image processing module, the one or more images from one or more different users; identifying, using an image processing module, a bounding box around the model depicted within each of the one or more images; and removing, using an image processing module, an image area outside of the bounding box, thus generating one or more cropped images.

Example 6 includes the subject matter of Example 5, wherein identifying the bounding box around the model comprises using a third neural network trained to identify the location of the model in a given image and generate the bounding box around the model in the given image.

Example 7 includes the subject matter of Example 6, wherein the third neural network is further trained to assign a confidence score to the bounding box, the method further comprising discarding the given image if the confidence score is below a given threshold.

Example 8 includes the subject matter of Example 6 or 7, wherein the third neural network is a supervised CNN.

Example 9 includes the subject matter of any one of Examples 5-8, wherein the removing is performed on a plurality of images thus creating a plurality of cropped images, and causing display of the at least a portion of one or more of the one or more images classified with the target body type and the target pose includes causing display of a set of cropped images from the plurality of cropped images, each cropped image having a model with the same article of clothing or accessory and having been classified with the target body type and the target pose.

Example 10 includes the subject matter of any one of Examples 1-9, wherein the model body type comprises a rectangular body type, a triangular body type, an hourglass body type, an inverted triangle body type, or a round body type.

Example 11 includes the subject matter of any one of Examples 1-10, wherein the model pose comprises a standing front view, a sitting front view, a standing side view, a sitting side view, a standing back view, or a sitting back view.

Example 12 is a system designed to determine a body type and a pose of models in a plurality of images. The system includes at least one processor and a plurality of modules executable by the at least one processor. The plurality of modules include an image processing module, a model classification module, an input module, and an output module. The image processing module is configured to identify an association between one or more images of the plurality of images, each of the one or more images including a model with a same article of clothing or accessory. The association is based on the same article of clothing or accessory present in each image. The model classification module is configured to classify a body type of the model depicted in each of the one or more images using a first neural network having one or more body type classification layers, and classify a pose of the model depicted in each of the one or more images using a second neural network having one or more pose classification layers. The input module is configured to receive a request from a user for an image having a model with the same article of clothing or accessory, the request designating the target body type and the target pose. The output module is configured to cause display of at least a portion of one or more of the one or more images classified with the target body type and the target pose.

Example 13 includes the subject matter of Example 12, wherein the one or more images includes images previously uploaded by one or more other users.

Example 14 includes the subject matter of Example 12 or 13, wherein the first neural network is a supervised convolutional neural network (CNN) trained to classify a body type of a model depicted in a given image, and the second neural network is a supervised CNN trained to classify a pose of a model depicted in a given image.

Example 15 includes the subject matter of Example 14, wherein the second neural network is further trained to: identify a previously unclassified pose for a model depicted in the given image; and generate a new pose classification for the model depicted in the given image.

Example 16 includes the subject matter of any one of Examples 12-15, wherein the image processing module is further configured to receive the one or more images from one or more different users, identify a bounding box around the model depicted within each of the one or more images, and remove an image area outside of the bounding box, thus generating one or more cropped images.

Example 17 includes the subject matter of Example 16, wherein the bounding box is identified using a third neural network trained to identify the location of the model in a given image and to generate the bounding box around the model in the given image.

Example 18 includes the subject matter of Example 17, wherein the third neural network is further trained to assign a confidence score to the bounding box, and wherein the image processing module is further configured to discard the given image if the confidence score is below a given threshold.

Example 19 includes the subject matter of Example 17 or 18, wherein the third neural network is a supervised CNN.

Example 20 includes the subject matter of any one of Examples 16-19, wherein the image processing module is configured to perform the removing on a plurality of images thus creating a plurality of cropped images, and the output module is configured to cause display of a set of cropped images from the plurality of cropped images, each cropped image having a model with the same article of clothing or accessory and having been classified with the target body type and the target pose.

Example 21 includes the subject matter of any one of Examples 12-20, wherein the model body type comprises a rectangular body type, a triangular body type, an hourglass body type, an inverted triangle body type, or a round body type.

Example 22 includes the subject matter of any one of Examples 12-21, wherein the model pose comprises a standing front view, a sitting front view, a standing side view, a sitting side view, a standing back view, or a sitting back view.

Example 23 is a computer program product including one or more non-transitory machine-readable mediums having instructions encoded thereon that when executed by at least one processor cause a process to be carried out for determining a body type and a pose of models in a plurality of images. The process includes classifying a model body type depicted in each of one or more images of the plurality of images using a first neural network having one or more body type classification layers, each of the one or more images including a model with a same article of clothing or accessory; classifying a model pose depicted in each of the one or more images using a second neural network having one or more pose classification layers; receiving a request from a user for an image having a model with the same article of clothing or accessory, the request including the target body type and the target pose; and causing display of at least a portion of one or more of the one or more images classified with the target body type and the target pose.

Example 24 includes the subject matter of Example 23, wherein the one or more images includes images previously uploaded by one or more other users.

Example 25 includes the subject matter of Example 23 or 24, wherein the first neural network is a supervised convolutional neural network (CNN) trained to classify a body type of a model depicted in a given image, and the second neural network is a supervised CNN trained to classify a pose of a model depicted in a given image.

Example 26 includes the subject matter of Example 25, wherein the second neural network is further trained to identify a previously unclassified pose for a model depicted in the given image, and generate a new pose classification for the model depicted in the given image.

Example 27 includes the subject matter of any one of Examples 23-26, where the process further includes receiving, using an image processing module, the one or more images from one or more different users; identifying, using an image processing module, a bounding box around the model depicted within each of the one or more images; and removing, using an image processing module, an image area outside of the bounding box, thus generating one or more cropped images.

Example 28 includes the subject matter of Example 27, wherein identifying the bounding box around the model comprises using a third neural network trained to identify the location of the model in a given image and generate the bounding box around the model in the given image.

Example 29 includes the subject matter of Example 28, wherein the third neural network is further trained to assign a confidence score to the bounding box, the method further comprising discarding the given image if the confidence score is below a given threshold.

Example 30 includes the subject matter of Example 28 or 29, wherein the third neural network is a supervised CNN.

Example 31 includes the subject matter of any one of Examples 27-30, wherein the removing is performed on a plurality of images thus creating a plurality of cropped images, and causing display of the at least a portion of one or more of the one or more images classified with the target body type and the target pose includes causing display of a set of cropped images from the plurality of cropped images, each cropped image having a model with the same article of clothing or accessory and having been classified with the target body type and the target pose.

Example 31 includes the subject matter of any one of Examples 23-30, wherein the model body type comprises a rectangular body type, a triangular body type, an hourglass body type, an inverted triangle body type, or a round body type.

Example 32 includes the subject matter of any one of Examples 23-31, wherein the model pose comprises a standing front view, a sitting front view, a standing side view, a sitting side view, a standing back view, or a sitting back view.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A method for determining a body type and a pose of models in a plurality of images, the method comprising:
    classifying, using a model classification module, a model body type depicted in each of one or more images of the plurality of images using a first neural network having one or more body type classification layers, each of the one or more images including a model with a same article of clothing or accessory;
    classifying, using the model classification module, a model pose depicted in each of the one or more images using a second neural network having one or more pose classification layers;
    receiving, using an input module, a request from a user for an image having a model with the same article of clothing or accessory, the request including the target body type and the target pose; and
    causing, using an output module, display of at least a portion of one or more of the one or more images classified with the target body type and the target pose.

2. The method of claim 1, wherein the first neural network is a supervised convolutional neural network (CNN) trained to classify a body type of a model depicted in a given image, and the second neural network is a supervised CNN trained to classify a pose of a model depicted in a given image.

3. The method of claim 2, wherein the second neural network is further trained to:
    identify a previously unclassified pose for a model depicted in the given image; and
    generate a new pose classification for the model depicted in the given image.

4. The method of claim 1, further comprising:
    receiving, using an image processing module, the one or more images from one or more different users;
    identifying, using an image processing module, a bounding box around the model depicted within each of the one or more images; and
    removing, using an image processing module, an image area outside of the bounding box, thus generating one or more cropped images.

5. The method of claim 4, wherein identifying the bounding box around the model comprises using a third neural network trained to identify the location of the model in a given image and generate the bounding box around the model in the given image.

6. The method of claim 5, wherein the third neural network is further trained to assign a confidence score to the bounding box, the method further comprising discarding the given image if the confidence score is below a given threshold.

7. The method of claim 4, wherein the removing is performed on a plurality of images thus creating a plurality of cropped images, and causing display of the at least a portion of one or more of the one or more images classified with the target body type and the target pose includes causing display of a set of cropped images from the plurality of cropped images, each cropped image having a model with the same article of clothing or accessory and having been classified with the target body type and the target pose.

8. A system configured to determine a body type and a pose of models in a plurality of images, the system comprising:
    at least one processor;
    an image processing module, executable by the at least one processor, and configured to identify an association between one or more images of the plurality of images, each of the one or more images including a model with a same article of clothing or accessory, the association based on the same article of clothing or accessory present in each image;
    a model classification module, executable by the at least one processor, and configured to
        classify a body type of the model depicted in each of the one or more images using a first neural network having one or more body type classification layers, and
        classify a pose of the model depicted in each of the one or more images using a second neural network having one or more pose classification layers;
    an input module, executable by the at least one processor, and configured to receive a request from a user for an image having a model with the same article of clothing or accessory, the request designating the target body type and the target pose; and
    an output module, executable by the at least one processor, and configured to cause display of at least a portion of one or more of the one or more images classified with the target body type and the target pose.

9. The system of claim 8, wherein the first neural network is a supervised convolutional neural network (CNN) trained to classify a body type of a model depicted in a given image, and the second neural network is a supervised CNN trained to classify a pose of a model depicted in a given image.

10. The system of claim 9, wherein the second neural network is further trained to:
    identify a previously unclassified pose for a model depicted in the given image; and
    generate a new pose classification for the model depicted in the given image.

11. The system of claim 8, wherein the image processing module is further configured to:
    receive the one or more images from one or more different users,
    identify a bounding box around the model depicted within each of the one or more images, and
    remove an image area outside of the bounding box, thus generating one or more cropped images.

12. The system of claim 11, wherein the bounding box is identified using a third neural network trained to identify the location of the model in a given image, generate the bounding box around the model in the given image, and assign a confidence score to the bounding box, wherein the image processing module is further configured to discard the given image if the confidence score is below a given threshold.

13. The system of claim 11, wherein the image processing module is configured to perform the removing on a plurality of images thus creating a plurality of cropped images, and the output module is configured to cause display of a set of cropped images from the plurality of cropped images, each cropped image having a model with the same article of clothing or accessory and having been classified with the target body type and the target pose.

14. A computer program product including one or more non-transitory machine-readable mediums having instructions encoded thereon that when executed by at least one processor cause a process to be carried out for determining a body type and a pose of models in a plurality of images, the process comprising:
    classifying a model body type depicted in each of one or more images of the plurality of images using a first neural network having one or more body type classification layers, each of the one or more images including a model with a same article of clothing or accessory;

classifying a model pose depicted in each of the one or more images using a second neural network having one or more pose classification layers;

receiving a request from a user for an image having a model with the same article of clothing or accessory, the request including the target body type and the target pose; and causing display of at least a portion of one or more of the one or more images classified with the target body type and the target pose.

15. The computer program product of claim 14, wherein the first neural network is a supervised convolutional neural network (CNN) trained to classify a body type of a model depicted in a given image, and the second neural network is a supervised CNN trained to classify a pose of a model depicted in a given image.

16. The computer program product of claim 15, wherein the second neural network is further trained to:

identify a previously unclassified pose for a model depicted in the given image; and generate a new pose classification for the model depicted in the given image.

17. The computer program product of claim 14, wherein the process further comprises:

receiving the one or more images from one or more different users;

identifying a bounding box around the model depicted within each of the one or more images; and removing an image area outside of the bounding box, thus generating one or more cropped images.

18. The computer program product of claim 17, wherein identifying the bounding box around the model comprises using a third neural network trained to identify the location of the model in a given image and generate the bounding box around the model in the given image.

19. The computer program product of claim 18, wherein the third neural network is further trained to assign a confidence score to the bounding box, the method further comprising discarding the given image if the confidence score is below a given threshold.

20. The computer program product of claim 17, wherein the removing is performed on a plurality of images thus creating a plurality of cropped images, and causing display of the at least a portion of one or more of the one or more images classified with the target body type and the target pose includes causing display of a set of cropped images from the plurality of cropped images, each cropped image having a model with the same article of clothing or accessory and having been classified with the target body type and the target pose.

* * * * *